Patented June 27, 1944

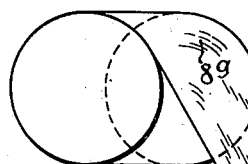
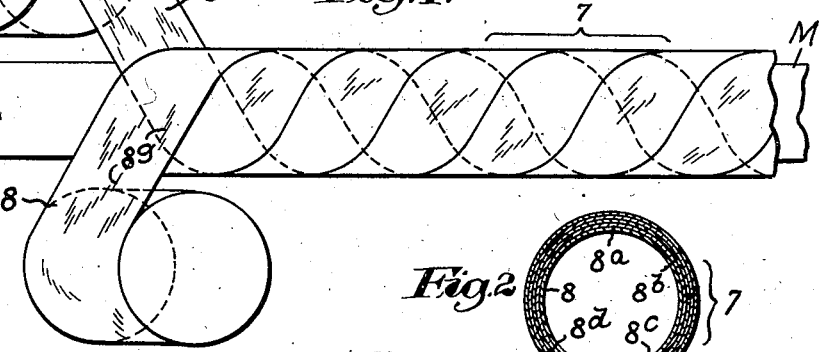
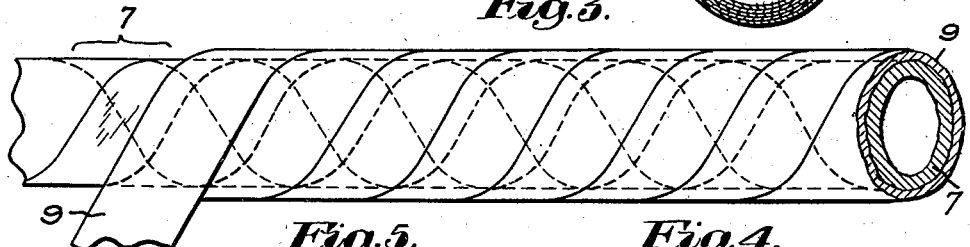
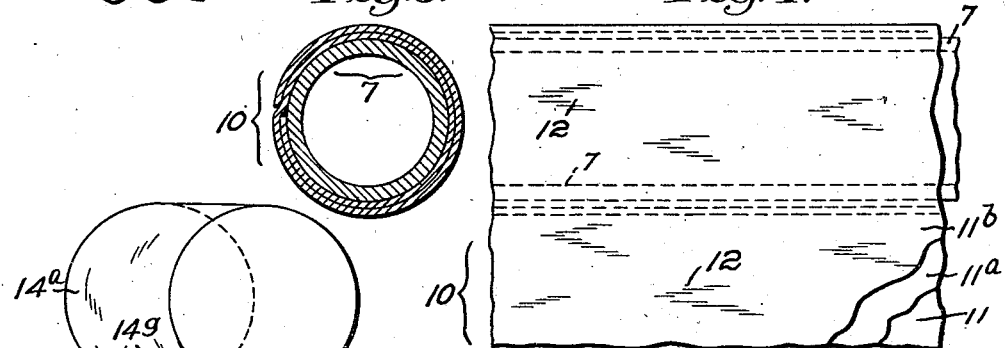
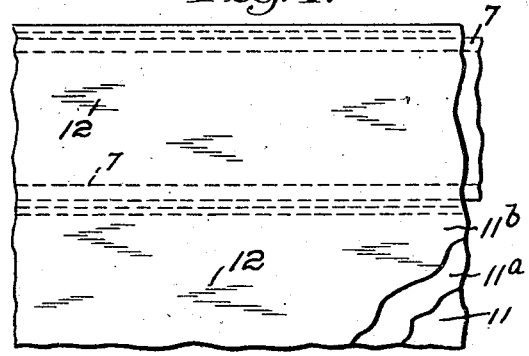
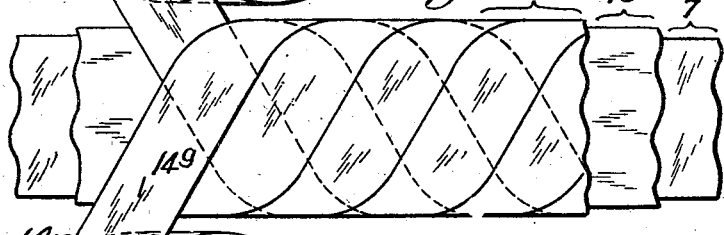
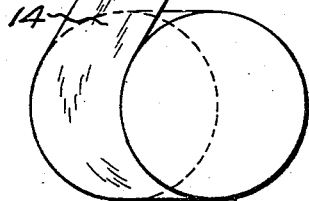
Inventor:
Paul R. Goldman.
by Emery, Booth, Townsend, Miller & Weidner
Attys.

2,352,533

UNITED STATES PATENT OFFICE 2,352,533

MANUFACTURE OF WOOD TUBING AND THE LIKE

Paul R. Goldman, Andover, Mass., assignor to Plymold Corporation, Lawrence, Mass., a body corporate Application November 28, 1942, Serial No. 467,243

3 Claims. (Cl. 144—309)

My present invention relates to the manufacture of tubes, pipes and other hollow cylindrical structures having thin wood strips and sheets as a component material. More particularly the invention, comprising both manufacturing processes and products, aims to provide for such structures novel constructions, arrangements and combinations of component means and elements presenting in the resulting articles and products distinctive strength and rigidity, both axially and radially, for a given mass and weight of the wood material, and wherein the relation as between flexure resistance as characterized by axial strength and rigidity, on the one hand, and crushing resistance as characterized by radial strength and rigidity, on the other hand, may be predeterminedly selected and calculated as appropriate to different use conditions and requirements.

Products, articles or structures as here concerned form the subject matter of my copending application Serial No. 526,462, filed March 14, 1944, as a division hereof, the claims of this application being directed to novel processes and methods applicable to the manufacture of said new and improved structures.

In the accompanying drawing, representing somewhat diagrammatically a typical embodiment of the invention and illustrating the novel process involved:

Fig. 1 shows an initial stage of the process, wherein a tubing core is formed;

Fig. 2 illustrates in cross-section a typical resulting core element;

Fig. 3, which also relates to the core-forming stage of the process, illustrates a further treatment of the core;

Figs. 4 and 5 represent an intermediate phase of the process being respectively an elevation of a short length of the tubing in process and a cross-section of the resultant structure;

Fig. 6 illustrates a step in the final or third phase of the process; and

Fig. 7 is a cross-sectional view of the finished tubing product.

Referring first more particularly to Figs. 1 and 2, the initial phase or operation in accordance with the invention comprises the formation of an inner element or core 7. For this purpose a removable mandrel M is employed, of a diameter the same as the inside diameter desired for the core and for the resulting tube or pipe as a whole. On this mandrel there is successively wrapped spirally a plurality of layers or laminae of thin wood stripping or veneer 8, 8a, etc. Each such layer is individually wound spirally with a selected pitch such that the leading and trailing edges of succeeding turns are abutted. Further, each succeeding spiral wrap is wound oppositely to the one preceding, so that the resulting core element 7, Fig. 2, is made up of the given plurality of layers or plies individually alternated as to the direction of wind.

Thus the side edge juncture line in any given layer crosses such line of any next adjacent layer, whether inside or outside it. Desirably also the plies having the same direction of wind, such for example as 8, 8b, 8d, etc., are slightly advanced or set back relative to each other, with resultant staggering or offsetting of their spiral joint lines. The number of windings, plies or layers for such core element 7 may be varied within a considerable range, depending on the wall thickness desired or permissible in any particular instance. In the majority of cases about three to seven plies are employed, with five representing the average construction, it being understood that the veneer strips such as 8 and 8a of Fig. 1 are representative and usually are followed by others such as 8b, 8c, 8d, Fig. 2, these being similarly applied under alternated spiraling starting at either end of the plural ply core 7. Desirably the individual wood strips or tapes 8, 8a, etc., which may themselves be plural ply in some instances, have the grain or predominant fibre direction disposed lengthwise of the strips, as indicated at 8g, Fig. 1, so that in the formed core 7 they extend angularly and out of parallel to the core axis.

Each such thin wood layer or wound strip 8, 8a, etc. as spirally laid on the mandrel is coated with a bonding or plastic agent, such as certain glues, cements or like adhesive or uniting agents, preferably one of the polymerizable or plastic type either of the cold setting or the heat setting varieties, depending on the particular field of use for the tubing product in the given instance.

On completion of the winding of the several plies of the core element 7, pressure is applied uniformly to the entire core, either before or after it is removed from the mandrel M. Such pressure application may be variously accomplished. An effective and convenient procedure is found to be that of temporarily wrapping the core 7 with a strip or web of resilient material 9, Fig. 3, such as a rubber or rubber-like composition, wound onto the core under tension proportioned to the degree of pressure desired. This resilient material 9 desirably not only is of a character susceptible of substantial tensioning or stretching in the course of its application but also is selected with reference to the particular bonding agent for the core, such as a urea formaldehyde application, and also to the temperature conditions for the setting or drying treatment which follows; that is, this material 9 for compression of the core, in the example noted, is resistant to the urea formaldehyde and to heat within the temperature range employed. The compression means such as 9 is removably held at its ends as by suitable ties or clamps not necessary to illustrate on Fig. 3.

The cores, such as the element 7, with the pressure-applying means such as 9 in position upon them are then subjected to a drying and setting or polymerizing treatment. In the case of cold-setting binding agents this may be accomplished by hanging or otherwise placing the tubing cores so as to subject them to ordinary room temperatures for a period of usually 24 to 48 hours, more or less. With heat-setting bonding agents the cores with the pressure-applying means upon them may be suspended in or passed through a drying compartment or oven at controlled temperatures generally of the range of about 180° to 240° depending on the particular agent and on the time available. In general also the polymerization, curing, drying or setting of the cores where relatively cool- or cold-setting agents are employed may be considerably accelerated by a heat treatment such as referred to.

Following the drying and setting operation, wherein the compressive pressure such as afforded by the resilient means 9 is maintained, with or without the application of heat, such means is removed from the core element 7. This completes the first phase or main operation of the process, leaving the core in individually finished condition as a compact and substantially homogenous unit in readiness for the surrounding outer elements to be described.

It is particularly noted that by reason of the wholly spiral disposition of the several component veneer strips 8, 8a, etc. of the inner base or core elements 7, maximum advantage is taken of the compression resisting capacity of such spirally formed structure. Resultantly these bases or cores 7 are of high rigidity and strength in the radial direction, that is, against stresses acting radially and tending to crush or deform them. It is a demonstratable fact that for a given total wall thickness the radial strength factor of a cylindrical structure varies with the diameter, being relatively high for the smaller diameters, and decreasing proportionately with any increase in diameter. Hence by utilizing the inherently radially rigid spiral formation for the innermost or base element 7, the one having the least internal diameter, the total resulting radial rigidity for the final tubing product of given overall or external diameter, is proportionately increased. Otherwise stated, due to its innermost location and consequent relatively small diameter, adequate radial rigidity is obtained with a less wall thickness and weight of component material. The result is a core or base 7 which is highly resistant to radial stresses but which is of relatively less rigidity in the axial direction, against forces tending to bend or deflect it or cause it to sag out of straight alignment, such as a weight or pressure intermediately applied to the element while it is supported only at or near its ends.

Turning now to Figs. 4 and 5, these represent diagrammatically a further and intermediate phase or step in the manufacturing process of the invention. A finished base tube or core 7 is now itself manipulated in the manner of a mandrel to receive upon it a longitudinally rigidifying element represented as a whole by the numeral 10. The resultant intermediate structure comprising the base 7 and the surrounding element 10 will be referred to as the tubing body.

As shown in Fig. 4 by way of example, this core-surrounding element 10 comprises one or more wrappings or layers of wood veneer in sheet form wound straight onto the core 7, that is, with the side edges of the veneer sheets perpendicular to the core axis. While the veneer for this core-surrounding element 10 may be of single thickness, preferably it comprises a plurality of plies, two or more, three of which plies 11, 11a, and 11b are shown in Fig. 4 by way of example. These several veneer plies are first adhesively or otherwise bonded together to provide the plural-ply sheet. Further, the wood material for these sheets is selected and arranged so as to have the grain or fibre extend predominately crosswise of the sheet, as indicated at 12 in Fig. 4, that is, in or approximately in parallelism with the axis of the core as the veneer is wound onto the latter.

The tubing base or core 7 has one or more full turns or wraps of the veneer sheeting 10 applied to it straightwise, that is, with a straight-on wind as above explained. As indicated diagrammatically and in an exaggerated manner at the left in Fig. 5, wherein two turns or layers of the veneer 10 are illustrated by way of example, the leading and the terminal longitudinal edges of this veneer are disposed in close radial proximity to each other, so that the entire resulting core-surrounding element 10 is of uniform thickness, with no excess overlap or part turns. The individual plies such as 11, 11a, 11b, Fig. 4, as also the spirally applied veneer strips 8, 8a, etc. of the tubing base, generally have a thickness of the order of about $1/64$ to $1/100$ of an inch in the smaller sizes of tubing; that is, tubing of internal diameters of from say ¼ inch up to 3 or 4 inches. Hence the outward deflection or shouldering of the material of the straight-wound veneer 10 where it passes from one convolution to the next, as at the left in Fig. 5, is but a similar small fraction of an inch in radial dimension. But by using a length of the veneer 10 precalculated to afford exactly the desired number of winds, or by cutting it off directly opposite the position of its leading longitudinal edge as applied upon the core, the terminal longitudinal edge is abutted against and merged with the adjacent shallow shoulder in smooth non-thickening juncture with it. After the following pressure and setting operations the resulting joint is scarcely discernible.

Prior to or during the operation of winding the core-surrounding element 10, it is coated at one or both faces, except at any externally exposed surface of the final wrap, with a similar impregnating and bonding agent as in connection with the formation of the core 7. The resulting composite tubing body composed of both the base 7 and the surrounding element 10 is then subjected to external pressure uniformly over its outer cylindrical surface. This again may be variously accomplished, as by temporarily winding onto it under determined tension a resilient pressure strip or web such as that indicated at 9, Fig. 3, in connection with forming the core. While maintaining this pressure the core-surrounding element 10 of the tubing body is cured, dried or set, with or without the application of heat, also as previously described in connection with Figs. 1 to 3. On completion of the drying and setting the pressure strip or other compressive means is removed, leaving the composite tubing body of Fig. 5 as the intermediate product of this second phase, operative step or step series of the plural-phase process as a whole.

Such composite body 7—10 has a high radial rigidity derived primarily from the base 7. This is effectively augmented by the surrounding element 10. The latter, however, serves mainly to afford an axial rigidity or flexure resistance in the resulting product of maximum efficiency with the given thickness and weight of the component wood material. This is largely due to the determined fact that for a given character and thickness of the wood material substantially greater longitudinal or axial rigidity is obtained from the straight-on or convolute wound formation as illustrated in Figs. 4 and 5 and wherein the natural graining or fibre direction of the veneer is disposed in general parallelism with the tubing axis. Further, such axial or flexure-resistant strength for a laminate wood cylinder of given wall thickness increases with the diameter of the cylinder; for example, such tube or cylinder of say 1½ in. diameter and having a wall thickness of say $\frac{3}{32}$ in. has a higher longitudinal rigidity, against axial flexure, than a similarly formed tube or cylinder of say ½ in. diameter with the same wall thickness and material.

Hence, in accordance with the invention, by locating the straight-grained straight-wound veneer element 10 in an outer position, outside the core or base 7, and thereby affording it a relatively larger diameter, the inherent high axial rigidity factor of such element 10 is made to contribute to a maximum extent toward a total axial rigidity for the resultant wood tubing product of a given material and given inside and overall diameter, wall thickness and weight. In the resulting tubing body such as 7—10 the two main elements of the first and second phases of the process thus cooperatively complement each other to produce a structure of remarkably high rigidity both radially and axially, and in which each such factor is present to a greater extent than in either of the elements alone. By relatively varying the thickness of the respective elements 7 and 10 the radial and the axial rigidity factors may be proportionately adjusted as any particular use circumstances may require. If desired, either or both the operational phases may be repeated one or more times.

With a straight-on application of straight-grained veneer as illustrated and described in connection with Figs. 4 and 5 there is in some instances a tendency at its outer surface for it to check or crack lengthwise of the tubing. To overcome this I complete the tubing by applying to any external straight-laid element such as 10 of the drawing an outer covering or protective and finishing jacket such as indicated as a whole by the numeral 13 in Figs. 6 and 7. This may be composed of one or more spiral wraps of thin wood stripping, two of which are here indicated at 14, 14a. The procedure for the application of these spirally disposed cover strips, in which the grain 14g preferably but not necessarily extends mainly lengthwise the strips, may be substantially the same as already fully described in connection with the first operative phase, Figs. 1 to 3. Hence this third or final phase of the process generally includes the operations of spiral winding, with reversal of direction in succeeding layers, application of the bonding agent, temporary installation of the compressive pressure material such as the resilient material 9 of Fig. 3, and the drying and setting, with or without the application of heat, all as explained in detail in connection with the preceding figures. The end product on removal of such pressure means of this third phase or step of the plural-phase process, is a finished substantially homogeneous tubing unit having hard and wear-resistant surfaces and having the high total radial and axial rigidity as above explained.

The methods and processes as herein disclosed and claimed are susceptible of practice in accordance with the copending joint application of Goldman et al., Serial No. 488,854.

My invention either as to process or product is not limited to the particular steps or embodiment as herein described or illustrated, its scope being pointed out in the appended claims.

I claim:

1. In plywood tubing manufacture, that process which comprises in combination the following operational phases and steps: preparing and furnishing in supply form to be drawn upon a plurality of tape-like wood-veneer strips of indefinitely continuous length arranged to present the wood graining predominantly lengthwise in the strips, forming a core structure by spirally winding about a removable mandrel a plurality of such supply strips respectively in edge-abutted relation in succeeding advancing spiral turns and concentrically superposing one strip upon another in alternated direction of spiral wind in succeeding layers, coating and impregnating each spiralled strip layer with a synthetic resinous heat-and-pressure polymerizable bonding agent, uniformly subjecting the resulting plural spiral-layer element to heat and pressure maintained pending hard-setting polymerization of the bonding agent, thereby and as a first operational phase providing a plural-layer core having the directions both of wind and of graining alternated spirally therein; thereafter laying and wrapping longitudinally straightwise upon such core one or more concentric layers of wood-veneer sheeting formed and arranged to present its graining predominantly lengthwise of the core axis, similarly coating and impregnating and bonding said sheeting and heat and pressure treating it as for the core, thereby and as a second operational phase to provide in combination with the core a composite tubing body of substantial rigidity and strength both radially and axially; and thereafter and as a third operational phase utilizing such body as a work unit and spirally winding a further plurality of the tape-like wood-veneer strips thereon in alternately opposite directions and similarly coating and impregnating except for the external surface of the final spiral layer and heat-and-pressure bonding such further alternated spiral layers as in the core and tubing body forming steps, to present a complete tubing product.

2. In plywood tubing manufacture, that process which comprises in combination the following operational phases and steps: preparing and furnishing in supply form to be drawn upon a plurality of tape-like wood-veneer strips of indefinitely continuous length arranged to present the wood graining predominantly lengthwise in the strips, forming a core structure by spirally winding about a removable mandrel a plurality of such supply strips respectively in edge-abutted relation in succeeding advancing spiral turns and concentrically superposing one strip upon another in alternated direction of spiral wind in succeeding layers, supplying coextensively between such layers a synthetic resinous heat-and-pressure polymerizable impregnating and bonding agent, uniformly subjecting the resulting plural spiral-layer element to heat and pressure maintained pending hard-setting polymerization of the bonding agent, thereby and as a first operational phase providing a plural-layer core having the directions both of wind and of graining alternated spirally therein; thereafter laying and wrapping longitudinally straightwise upon such core one or more concentric layers of wood-veneer sheeting formed and arranged to present its graining predominantly lengthwise of the core axis, similarly supplying a like impregnating and bonding agent between the core and said sheeting and heat and pressure treating it as for the core, thereby and as a second operational phase to provide in combination with the core a composite tubing body of substantial rigidity and strength both radially and axially; thereafter and as a third operational phase utilizing such body as a work unit and spirally winding thereon a further wood veneer strip and supplying a like agent between it and such tubing body, and impregnating and heat-and-pressure bonding such further spiral winding as in the core and body forming steps, to present a tubing product subject to any desired finishing treatment.

3. In plywood tubing manufacture, that process which comprises in combination the following operational phases and steps: preparing and furnishing in condition to be drawn upon supplies of tape-like wood-veneer stripping of indefinitely continuous length arranged to present the wood graining predominantly lengthwise thereof, spirally winding about a removable mandrel at least one such tape-like wood-veneer strip in edge-abutted non-overlapping relation in succeeding advancing spiral turns, thereby and as a first operational phase forming a hollow tubular core for the support of succeeding veneer layers, and applying thereto a synthetic resinous impregnating and bonding agent adapted for heat-and-pressure polymerization; thereafter laying and wrapping longitudinally straightwise upon such core one or more concentric layers of wood-veneer sheeting formed and arranged to present its graining predominantly lengthwise of the core axis, and bonding said sheeting to the core by heat-and-pressure treatment effective upon said applied bonding agent, thereby and as a second operational phase to provide in combination with the core a composite tubing body of substantial rigidity and strength both radially and axially; and thereafter and as a third operational phase utilizing such body as a work unit and spirally winding thereon a further wood-veneer strip and supplying a like agent between it and such tubing body, and impregnating and heat-and-pressure bonding such further spiral winding as in the preceding operational phase, to present a tubing product subject to any desired finishing treatment.

PAUL R. GOLDMAN.